No. 671,399. Patented Apr. 2, 1901.
J. MISKOLCZY.
ART OF REFRIGERATION.
(Application filed Aug. 10, 1899.)
(No Model.)
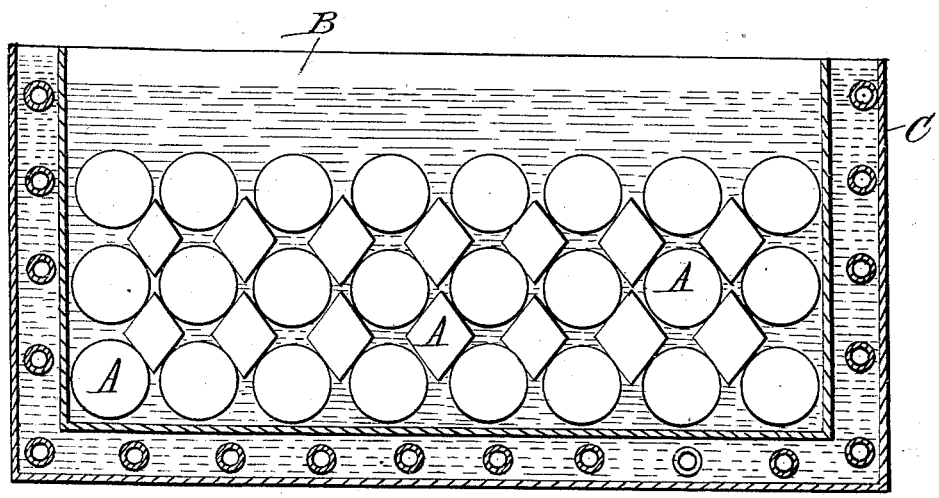
Witnesses:
Franck L. Ourand.
E. H. Larry
Inventor:
Joseph Miskolczy.
by R. S. Dyrenforth
his attorney.
THE NORRIS PETERS CO., PHOTO-LITHO., WASHINGTON, D. C.

UNITED STATES PATENT OFFICE.

JOSEPH MISKOLCZY, OF NEW YORK, N. Y.

ART OF REFRIGERATION.

SPECIFICATION forming part of Letters Patent No. 671,399, dated April 2, 1901.

Application filed August 10, 1899. Serial No. 726,811. (No model.)

*To all whom it may concern:*

Be it known that I, JOSEPH MISKOLCZY, a citizen of the United States, residing at New York, in the county of New York and State of New York, have invented certain new and useful Improvements in the Art of Refrigeration; and I do hereby declare the following to be a full, clear, and exact description of the invention, such as will enable others skilled in the art to which it appertains to make and use the same.

The object of the invention is to obviate the taste of brine from vitiating a refrigerant used for cooling liquids or food.

In an application filed by me in the United States Patent Office June 15, 1899, as Serial No. 720,721, I describe, among other things, what I term "cold cartridges" for effecting refrigeration of drinkable liquids, such as water, beer, &c. As therein described, these cartridges consist of a suitable shell or holder, which may be of glass or of any suitable conductive substance—such as metal, silver or nickel plated—containing a body of ice and adapted to be placed bodily within the liquid to be cooled. I have found by experiments that it is impossible where these cartridges are frozen in an ordinary brine to free the cartridges of the taste of the brine, so that their use will be objectionable when placed naked in a liquid to be cooled.

It is the object of this invention to obviate this objectionable feature; and to this end the invention consists in the method of freezing a so-called "cold cartridge" in such manner as thoroughly to eliminate any taste of brine, as a salt or other brine having any taste, or other undesirable qualities when mixed with food or drink.

In the accompanying drawing, forming a part of this specification, and in which like letters of reference indicate corresponding parts, I have illustrated, diagrammatically, one mode of procedure of carrying my invention into effect.

In practicing my invention I take any number of these cartridges A, which, as stated, may be made of glass, metal suitably nickel-plated, or of pure non-corrosive metal, as aluminium, and of any preferred shape and size, and place these in an envelop or holder containing pure water. As shown in the figure and to economize space, part of the cartridges are shown as round, or approximately so, and part lozenge shape, these latter to fill any space between the superposed layers of cartridges. The holders containing these cartridges are then immersed in a suitable freezing mixture, such as liquefied air kept down to its liquid point by suitable means, not necessary to be shown, or in very cold air, or the holder may be immersed in the ordinary brine, the point being to keep the cartridges out of contact with the freezing mixture, no matter what its character may be. After perfect congelation of the contents of the cartridges has been effected the holder will be removed from the freezing mixture and the cartridges broken out or otherwise removed from the holder. The cartridges may be partly filled with water and sealed or partly filled with water, air-exhausted, and then sealed.

Having thus fully described my invention, what I claim as new, and desire to secure by Letters Patent of the United States, is—

1. The method of freezing a body to constitute a refrigerant for the cooling of foods or liquids by direct contact therewith, which consists in taking a suitable body or holder, filling or partly filling it with a liquid, and sealing, then placing such body in a holder containing water, and then immersing the holder in a suitable freezing mixture, substantially as described.

2. The method of freezing a body to constitute a refrigerant for the cooling of foods or liquids by direct contact therewith, which consists in taking a suitable body or holder, filling or partly filling it with a liquid, and sealing, then placing such body in a holder containing water, and then immersing the holder in a freezing agent, such as very cold air or liquefied air, substantially as described.

In testimony whereof I affix my signature in presence of two witnesses.

JOSEPH MISKOLCZY.

Witnesses:
E. R. HOLDEN,
KATE MICHELS.